Figure 1:
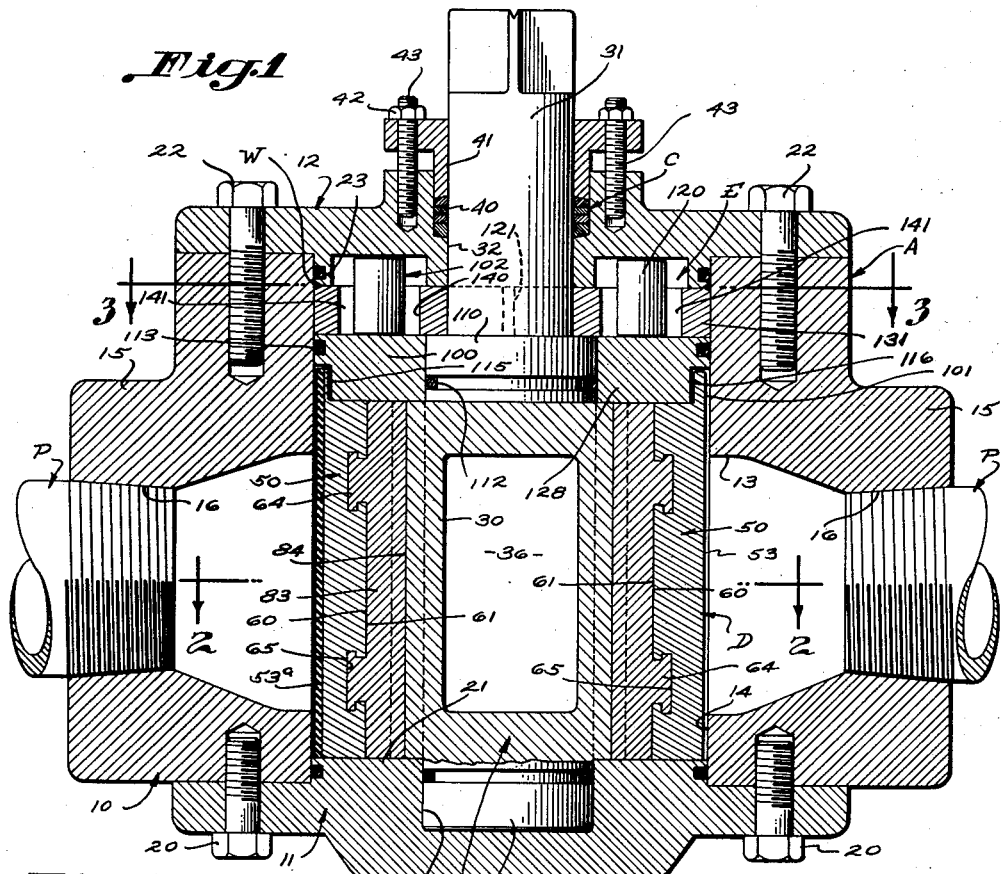

May 10, 1955

J. HEINEN 2,708,094

PLUG VALVE

Filed May 24, 1952

3 Sheets-Sheet 1

INVENTOR.
JOSEPH HEINEN
BY
*[signature]*
Attorney

May 10, 1955  J. HEINEN  2,708,094
PLUG VALVE
Filed May 24, 1952  3 Sheets-Sheet 2
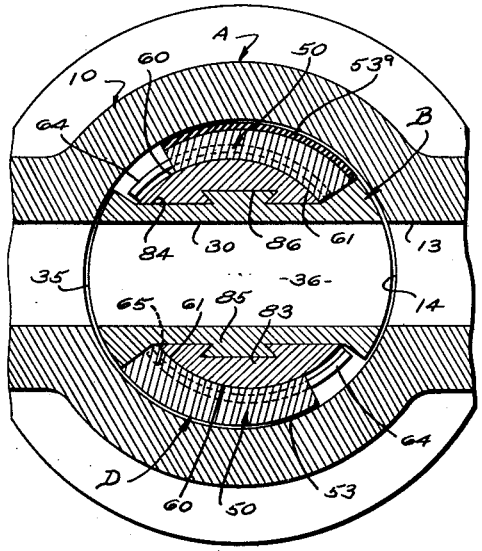
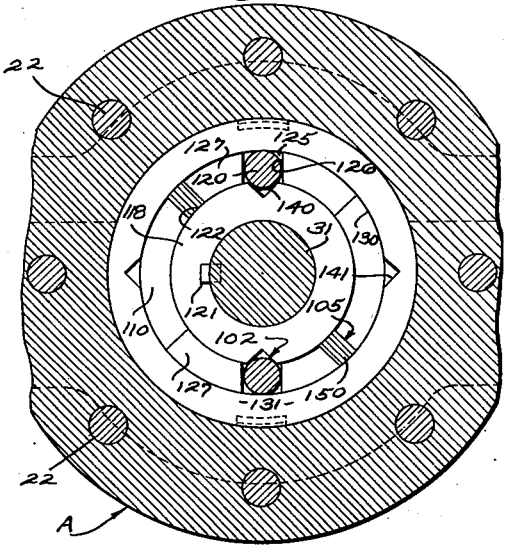
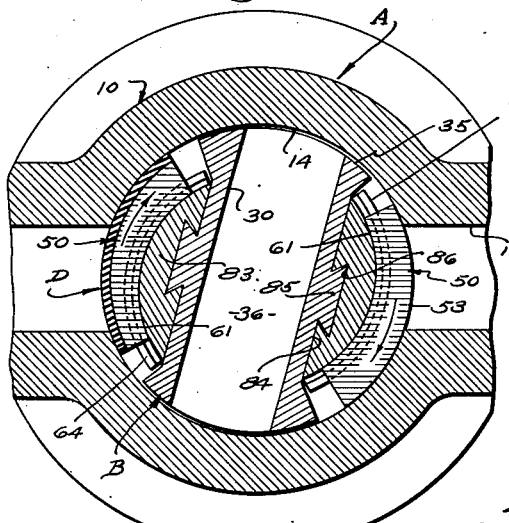
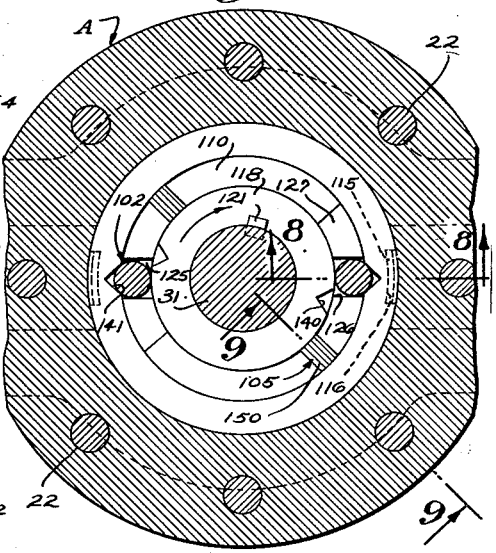
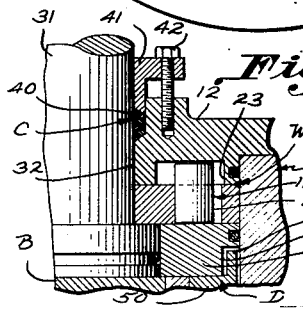
INVENTOR.
JOSEPH HEINEN
BY
Attorney.

May 10, 1955  J. HEINEN  2,708,094
PLUG VALVE

Filed May 24, 1952 3 Sheets-Sheet 3

INVENTOR.
JOSEPH HEINEN.
BY
Attorney.

United States Patent Office 2,708,094
Patented May 10, 1955

2,708,094
PLUG VALVE

Joseph Heinen, Long Beach, Calif.

Application May 24, 1952, Serial No. 289,856

9 Claims. (Cl. 251—163)

This invention relates to a plug valve and it is a general object of the invention to provide a simple, practical, improved construction for a plug valve of the type wherein the plug rotates in a body and has a sealing plate shiftable into and out of engagement with the body to effect a seal.

It is a general object of the present invention to provide a plug valve of the general character referred to wherein the plate, carried by the plug and serving to effect the seal, is positively operated into and out of sealing engagement with the body and at no time rubs or slides in the body in a manner to score or in any way injure the walls or surfaces with which the plate cooperates to effect the desired seal.

It is another object of this invention to provide a plug valve which is of the general character referred to and which is characterized by a simple, practical control mechanism positively governing operation of the sealing plate radially of the plug, which mechanism is wholly without spring or like elements likely to fail or which are uncertain as to operation.

It is another object of this invention to provide a plug valve of the general character referred to wherein the mechanism provided for effecting a control of the plate relative to the plug involves but few simple, easily manufactured parts, making the mechanism as a whole simple, practical, and inexpensive of construction.

A further object of the present invention is to provide a valve of the general character referred to in which the control governing the action of the plate relative to the plug is a simple mechanism confined to one end of the plug, and in a preferred form of the invention this mechanism is made accessible by a removable cap section of the plug body.

A further object of this invention is to provide a plug valve of the general character referred to characterized by a plate controlling mechanism at each end of the plug, which mechanisms are alike and operate simultaneously to the end that the operation of the plate is balanced.

The present invention is concerned, generally, with a plug type valve wherein there is a body with a flow passage and an intersecting plug opening, preferably a bore. A plug is carried in the bore of the body and has a stem portion projecting from it. The body of the plug has an opening through it adapted to be moved into and out of register with the flow passage of the body, and a sealing plate is carried by the body of the plug and is shiftable radially of the body of the plug by a cam means. The cam means requires operation or rotation of the plug body relative to the plate. The invention provides a control mechanism for the plate and this mechanism serves to initially lock or couple the plate and the stem of the valve so that these elements rotate together as the stem is operated to move the plate from an open position out of register with the flow passage to a closed position in register with the flow passage. The couple between the plate and stem is then released and the plate is held against rotation in the bore carrying the plug and is free to move radially so that continued rotation of the stem actuates the cam means and moves the plate radially outward into sealing engagement with the wall of the bore in the body.

Figure 2:
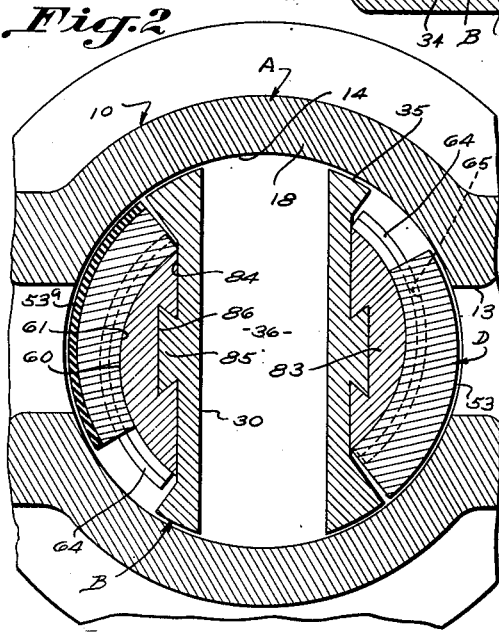
Figure 3:
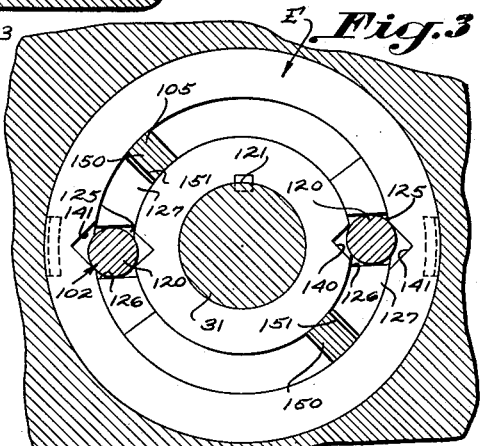
Figure 10:
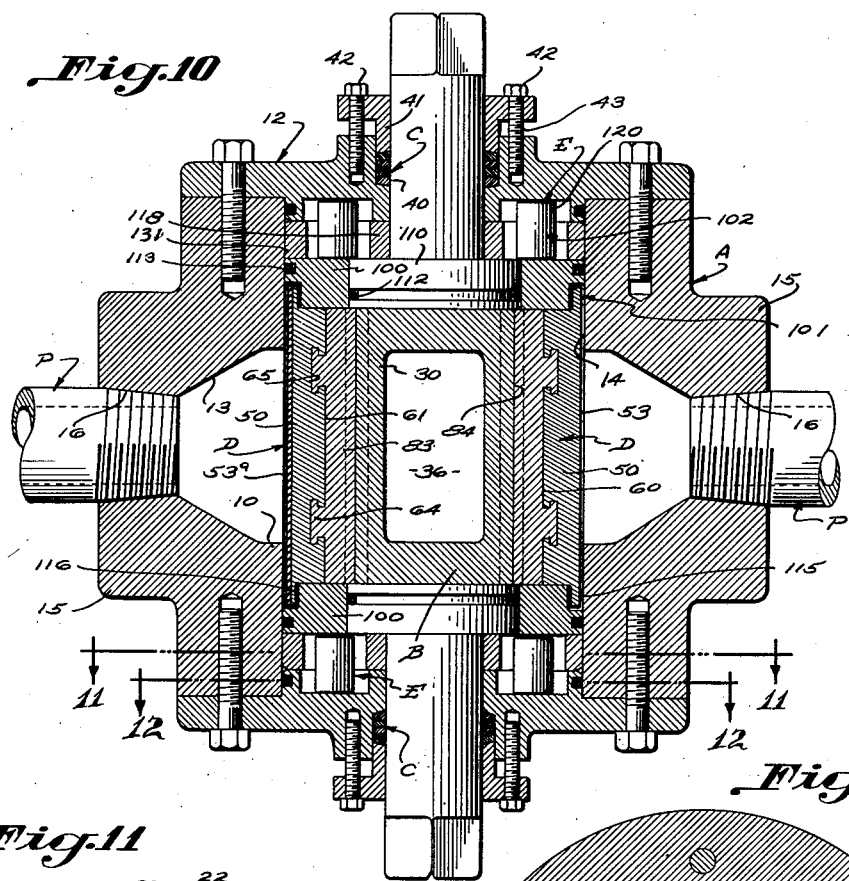
Figures 11, 12:
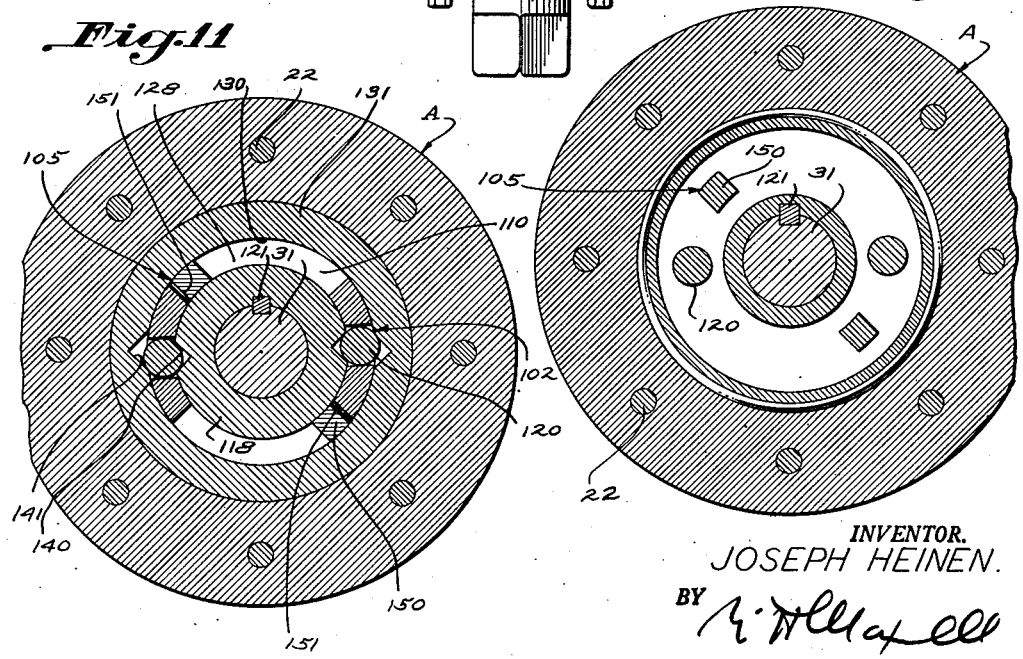

The various objects and features of my invention will be fully understood from the following detailed description of typical preferred forms and applications of the invention, throughout which description reference is made to the accompanying drawings, in which:

Fig. 1 is a vertical detailed sectional view of a plug valve embodying a form of the present invention and shows the parts positioned where the sealing plates provided at diametrically opposite sides of the plug have been stopped, in which position the plates occur as the lug releases the plates from the stem and engages them with the body. Fig. 2 is a plan section taken as indicated by line 2—2 on Fig. 1 and is a view illustrating the sealing plates stopped and ready to be moved radially outward into sealing engagement with the wall of the bore in the body. Fig. 3 is a detailed sectional view taken as indicated by line 3—3 on Fig. 1, illustrating the floating element of the control means stopped and the lock members related thereto in the course of being transferred from locking engagement with the stem to locking engagement with the body. Fig. 4 is a reduced plan section similar to Fig. 2, illustrating the plug in the open position where the sealing plates are retracted and out of engagement with the body. Fig. 5 is a reduced view similar to Fig. 3, illustrating the parts in the position in which they occur when the plug and body are related, as shown in Fig. 4. Fig. 6 is a view similar to Fig. 4, illustrating the sealing plates out or in sealing engagement with the wall of the bore occurring in the body. Fig. 7 is a view similar to Fig. 5, showing the parts positioned as they are when the plug and body are related, as shown in Fig. 6. Fig. 8 is a detailed sectional view of a portion of the mechanism, being a view taken as indicated by line 8—8 on Fig. 7. Fig. 9 is a view similar to Fig. 8, being a view taken as indicated by line 9—9 on Fig. 7. Fig. 10 is a view similar to Fig. 1, showing a somewhat modified form of construction wherein there is a plate control means at each end of the plug. Fig. 11 is a plan section taken as indicated by line 11—11 on Fig. 10, and Fig. 12 is a plan section taken as indicated by line 12—12 on Fig. 10.

The structure including the present invention involves, generally, a body A, a plug B operable in the body, packing means C between the stem of the plug and the body, sealing means D sealing between the plug and the body, and control means E for the sealing means D.

The main section of the body is shown as an elongate, horizontally disposed part, having a flow passage 13 extending through it from one end to the other. A plug opening 14 extends vertically through the body section 10 and intersects the flow passage 13 intermediate its ends. The outer or end portions of the flow passage 13 are round in cross-sectional configuration and at the outer end portion 15 the section 10 is provided with coupling means whereby pipes P, or the like, may be joined to the valve. In the particular case illustrated the outer end portions of the flow passage 13 are internally threaded at 16 for the reception of the pipe P, or the like.

In accordance with the preferred form of the invention the flow passage 13 narrows or decreases in width as it progresses inwardly from the threaded end portions 16 and increases in height as it progresses inwardly, with the result that the passage is narrow and high, or of greater vertical extent than horizontal extent at the points where it intersects or joins the plug opening 14. This formation of flow passage 13 is clearly illustrated in Figs. 1 and 2 of the drawings. If desired, the flow passage may be round.

The plug opening 14 extends transversely through the section 10 from one side to the other, and as the structure is illustrated it extends between the upper and lower sides. The opening 14 is preferably a round opening, that is, it is round in cross-sectional configuration and is uniform in diameter throughout its length, being a simple bore formed straight through the body section from one side to the other. It is to be noted from Fig. 2 of the drawings that the plug opening 14 is of such diameter relative to the flow passage 13 as to establish wall portions 18 of substantial circumferential extent between the points where the flow passage 13 communicates with the plug opening 14.

The bottom section 11 of the body A is arranged at or is applied to the bottom side of the main section 10 to form a closure for the lower end of the plug opening 14. In the case illustrated the section 11 is separable from the main section 10 being joined thereto by releasable fasteners in the form of screw fasteners 20. In the particular case illustrated the section 11 is provided with a round boss 21 that enters the lower end of the plug opening 14 and which serves to centralize or locate the section 11 relative to the section 10.

The top section 12 of the body is located at the top side of the body or main section 10 and like the section 11 it is separable from the section 10. The top section 12 is shown releasably joined to section 10 by suitable screw fasteners 22 and it is shown provided with a round boss 23 which enters the upper end of plug opening 14 to centralize or locate the section 12 relative to section 10.

The plug B occupies the plug opening 14 or the chamber formed in the body A by the opening 14 and it has a body or main portion 30 located between the sections 11 and 12 and a stem 31 projecting from its upper end through opening 32 formed centrally in the section 12. A centering pin or projection 33 depends from the lower end of the plug body into a central socket opening 34 in the body section 11. In practice, through this construction, the plug is rotatably supported through or by means of the stem 31 and the centering pin 33. This structure relieves the sealing plates of thrust when the valve is opened under pressure. It is preferred in practice that the exterior 35 of the plug body 30 be turned or formed so that it is round and concentric with the longitudinal axis of the plug and fits the plug opening 14 with working clearance, it being unnecessary to provide bearing engagement between the plug body 30 and the wall of the opening 14, as the plug may be supported through the construction above-described.

The body or main portion of the plug 30 is characterized by a flow aperture or port 36 extending laterally and diametrically through the body 30 from one side to the other. The port 36 of the plug is preferably of such size and shape as to correspond with the flow passage 13 where it intersects the plug opening 14 and the parts are arranged and related so that the port 36 can be moved into and out of register with the passage 13, as will be apparent from Figs. 2 and 4 of the drawings.

The packing means C may be any suitable means that will serve to pack between the stem 31 of the plug B and the body A. In the case illustrated a simple packing means is shown and it evolves a body of packing 40 carried in body section 12 and engaged by a follower 41 operated by nuts 42 on lugs 43 projecting from the section 12.

The sealing means D provided by the present invention may be located at or confined to one side of the plug body 30 to engage the body or section 10 of the body where one end portion of the flow passage 13 intersects the plug opening 14. It is preferred, however, that there be two like units of the means D, one at each side of the body 30, so that two seals are established between the plug and the body simultaneously.

The units of means D are preferably alike and each preferably includes a sealing plate 50 and cam parts or cam engagement between the plate 50 and the body of the plug. The plates may, if desired, be of different materials, say one of metal and the other non-metallic, or a combination of metal and rubber, or the like.

The sealing plate 50 is of such vertical extent as to extend above and below the opening 13. In the case illustrated in Figs. 1 to 9, inclusive, the plates extend down to the body sections 11 and up to the means that occurs between the upper end of the plug body and body section 12. Each plate 50 is of such circumferential extent as to extend beyond or overlap the vertical edges of the opening 13 with which it cooperates when in the closed position, such as shown in Fig. 2.

In accordance with the invention the outer face 53 of the plate, which is the sealing face of the plate, is cylindrically curved or is curved so that it has the same curvature as the inner wall of the plug opening 14, with the result that a tight, continuous, metal to metal engagement may be established between the plate and the marginal portion of the wall of opening 14 surrounding the flow passage 13 where it intersects opening 14. It will be apparent that with my construction the sealing face of the plate may be coated or surfaced, as with a sealing member or washer-like part 53a, say, for example, a sheet of rubber or the like if circumstances so require.

The cam engagement provided between the body of the plug and plate involves a cam face 60 on the exterior of the plug and a corresponding cam face 61 at the inner side of the plate. In accordance with my invention the cam surfaces 60 and 61 are curved about a single or common center which is somewhat offset or removed from the central axis of the plug so that as the plate is moved circumferentially relative to the plug with the cam faces 60 and 61 in engagement, the plate is shifted radially of the plug. When the plate is in one extreme position or at one end of its possible movement around the plug, as shown in Fig. 4, it is retracted or in the innermost position and is clear of the wall of the bore or body opening 14, whereas, when it is in the position shown in Fig. 6 it is in an out or working position and has sealing engagement with the wall of bore 14 surrounding the flow passage 13. When the parts are positioned as shown in Fig. 2 the plate has just started outward from the position shown in Fig. 4.

In accordance with my invention I join the plate to the plug so that the cam surfaces 60 and 61 are maintained in engagement with each other. In the particular case illustrated a rib-like key construction is employed and, as shown in the drawings, two vertically spaced ribs 64 are provided on the plug extending circumferentially thereof and following the curvature of cam surface 60, and these ribs are slidably received in grooves 65 in the inner side of the plate 50. It is to be noted that the ribs 64 and grooves 65 have locked engagement, causing the plate to be maintained in seated engagement on the plug so that cam faces 60 and 61 are always together or engaged while the plate is free to move circumferentially of the plug body.

It is to be observed that the eccentricity of the cam surfaces 60 and 61 relative to the central axis of the plug is such that when the plate 50 has been stopped in the body section 10 opposite the flow passage 13 and rotation of the plug body is continued, the cam surfaces 60 and 61 move relative to each other causing the plate 50 to be moving radially outward relative to the plug and into pressure engagement with the wall of opening 14 around the passage 13.

The cam portion of the plug body, that is, the portion of the plug body provided with the cam surface 60, is preferably formed as a section 83 separable from the main portion or body 30 of the plug. This construction is provided mainly to simplify manufacture. In the particular case illustrated the body 30 of the plug is provided with a flat side 84 on which the section 83 is mounted or fixed. In the case illustrated the plug section 83 is fixed in position by means of a longitudinal rib or key 85 projecting from the flat side 84 and engaged in a longitudinal groove or channel 86 in the section 83. The rib 85 and groove 86 extend longitudinally from one end of the plug body 30 to the other, and they have dovetailed engagement, causing the section 83 to be held tight against the side 84 of the body.

With the construction just described it is simple and economical to form the flat side of the body of the plug with the rib 85 and it is simple to form the section 83 of the plug with the cam surface 60 at its outer side and the groove 86 at its inner side so that when the section 83 is in place on the body 30 the cam surface 60 has the desired eccentricity relative to the central axis of the plug.

The control means E is provided to control movement of each plate 50 included in the structure with, or relative to, the body 30 of the plug. The means E provides for locking each plate 50 to the body of the plug or to the stem which is a part of the plug, so that the plate moves around within the bore 14 as the stem 31 is turned from a position where the plate is retracted and open to a position where the plate is opposite or in register with the flow passage and ready to be moved radially. The means E provides for stopping the plate when it has been moved to the last named position, and effects release of the plate relative to the stem or to the body of the plug, so that further rotation of the stem in the direction that brought the plate to said last named position effects operation of the cam means, so that the plate is forced out or radially into sealing engagement with the wall of the bore 14.

In the form of the invention illustrated on sheets 1 and 2 there is but one unit or embodiment of the control means E incorporated in the structure, and this occurs within the bore 14 and between the top or cap section 12 of the valve body A and the top or upper end of the plug body 30, and it surrounds the stem 31 of the plug. This embodiment of the means E is shown as simultaneously controlling or operating both plates 50 incorporated in the structure. However, the action or control of but one plate will be described, it being understood that the description is applicable to both of the plates.

The control means in the form illustrated includes, generally, a floating element 100, preferably a ring surrounding a portion of the stem provided on the plug. The ring is located adjacent the upper end of the plug body. A coupling means 101 connects the plate 50 to the floating ring so that the plate is free to move radially relative to the ring, but cannot move relative thereto about the axis of the plug. A releasable lock means 102 is adapted to releasably connect the stem on the plug and the floating ring, and a stop means 105 is provided to positively stop the plate in position where it is opposite or in register with the flow passage 13 through the body A.

The floating element 100, which is preferably a ring, surrounds and is rotatable relative to an enlarged portion or base 110 of the stem 31, which base of the stem occurs adjacent the upper end of the body 30 of the plug. The floating ring is rotatable in the bore 14 and a sealing ring 112 is provided to seal between the base 110 of the stem and the interior of the ring 100, and a sealing ring 113 is provided to seal between the exterior of the ring 100 and the wall of bore 14.

The coupling means 101 is shown as involving a simple lug 115 projecting upwardly from the top or upper end of the plate 50 into a socket 116 provided in the floating ring 100. The engagement or fit of the lug 115 in the socket 116 is such as to allow for the required radial movement of the plate 50 relative to the plug, but locks or couples the plate to the floating ring so that these parts will not move relative to each other in either direction about the axis of the plug.

The releasable lock means 102 is adapted to connect the stem 31 and the floating ring for rotation of the ring with the stem sufficient to move the plate between an open position such as is shown in Fig. 4 and a position such as is shown in Fig. 2, following which it is released and frees the parts so that the stem can continue to turn, leaving the plate 50 in the position shown in Fig. 2, so that the cam means hereinabove described effects radial movement of the plate into the closed or sealing position shown in Fig. 6.

The lock means 102 is shown as including a drive element 118 on the stem 31 and a lock member 120 carried by the floating ring 100 to be shiftable radially relative thereto, but not movable relative thereto about the axis of the plug.

The drive element or drive part 118 is fixed relative to the stem 31 and is, in effect, a part of the plug. For simplicity of manufacture part 118 is shown as a part formed separate from the stem and secured thereto by a key 121. The drive part projects radially from the stem, preferably at a point just above the base portion 110 of the stem, and it has a round or turned periphery 122 concentric with the stem.

The lock member 120 is preferably a roller disposed parallel with the stem 31 and it is carried in or confined to a recess 125 that occurs between spaced opposed shoulders 126 provided on arcuate projections 127 which are part of the floating ring. In the preferred arrangement the arcuate projections 127 are curved concentric with the stem 31 and they project up from the main portion 128 of the floating ring to engage more or less closely around the drive element 118. The arcuate or curved projections 127 on the floating ring fit within the bore or opening 130 occurring in a collar 131 which is rigid with and is, in effect, a part of the main body A of the valve. In the preferred construction the collar is formed on or as a part of, or it is rigidly attached to, the part 23 of cap 12, as by welding W, and it is thus located in the bore 14 immediately above the floating ring and surrounds the drive member 118 and is rigid with the elements 10, 11 and 12 of the body A.

The lock member or roller 120 has two working positions, one an in or locked position such as is shown in Fig. 5, where it is between the shoulders 126 and projects radially inward to engage in a recess 140 provided in the periphery of the drive part 118. In the other or out position the lock roller 120 is confined between the shoulders 126 and projects radially outward into a recess 141 provided in the bore or opening 130 that occurs in collar 131. This out or released position of the lock member is illustrated in Fig. 7 of the drawings. It is to be noted from the drawings that the diameter of the lock roller 120 is greater than the radial extent or thickness of the arcuate projections 127 and is greater than the space occurring between the wall of the opening 130 in the collar 131 and the outer periphery of the drive member 118. It is because of this relationship that the drive roller must be in one or the other of the positions above described, or, if the recesses 140 and 141 are in register or opposite each other, as shown in Fig. 3, the roller may move radially either inward or outward, to move from one recess to the other.

It is to be noted that the recesses 140 and 141 are V-shaped and, therefore, when the roller is in recess 140 and strain or rotative force is being communicated through the roller, it tends to move radially outward, whereas when the roller is in recess 141 and rotative strain is being communicated through it, it tends to move radially inward.

The stop means 105 involves a stop lug 150 fixed relative to the body A of the valve and cooperating with one of the curved projections provided on the floating ring 100. In the preferred construction the stop lug 150 is fixed to and depends from the cap 12 of the valve body to enter between the drive element 118 and the collar 131. One of the arcuate or curved projections 127 is on the floating ring 100. In the preferred construction the stop lug 150 is fixed to and depends from the cap 12 of the valve body to enter between the drive element 118 and the collar 131. One of the arcuate or curved projections 127 on the floating ring has a stop shoulder 151 which engages the stop lug 150 when the plate has been rotated from the open position shown in Fig. 4 to the closed position shown in Fig. 2, from which position the plate is adapted to be operated radially into sealed engagement with the wall of the body portion 14.

In carrying out the present invention where the structure involves, say, two plates 50, the means E as hereinabove described is preferably constructed so that there are two diametrically opposite lock rollers 120 and the parts related thereto are as hereinabove described. Further, as will be observed from sheet 3 of the drawings it is contemplated that the present invention may be carried out by employing lock means E at both ends of the lug 30 and in the case illustrated stems occur at each end of the plug and the lock means E at each end of the structure correspond to the means as hereinabove described. In the case illustrated both stems project from the body to be accessible at the exterior of the body.

From the foregoing description it will be apparent that the construction provided serves to positively connect or lock the plates 50 to the rotating element or plug so that when the plug is turned between the open position shown in Fig. 4 and the closed position such as is shown in Fig. 2, the plates are carried around with the plug. The plates may be thus caused to come opposite the flow passages occurring in the body of the valve.

After the plates have been positioned or located opposite the flow passage in the body A continued rotation of the plug or the stem results in operation of the cam means which effects radial movement or outward shifting of the plates until they are forced tightly into sealing engagement wtih the wall of bore 14. When a reverse operation occurs the plug turns relative to the plates, causing the plates to be moved in or retracted radially, so that they are clear of the wall of bore 14 until such time as the recess 140 in the drive member comes opposite the roller 120, whereupon the roller is free to move radially inward, as it will do under the rotative strain occurring on it, thus causing the roller to assume a position such as is shown in Fig. 5, where the drive member is locked to the floating ring. As rotation of the stem continues the plates are carried around until they finally reach the full open position such as is shown in Fig. 4.

From the foregoing description it will be apparent that when employing diametrically opposite sealing plates 50, as shown throughout the drawing, the plates are simultaneously operated in opposite directions radially of the plug to positively seal with the body at both sides of the plug. Further, it will be apparent that through my construction I do not depend upon maintaining metal to metal contact between a solid or rigid plug and a solid body, but rather I provide a plug with parts, namely, the plates 50, which are radially shiftable and which move out in response to rotation of the plug so that the plug body need not fit accurately in the body and a seal may be established even though pressures be high and such as to cause slight distortion or expansion of the body.

It is further to be noted that through the construction that I have provided the structure involves few simple, easily formed parts, and I gain a positive double seal between the plug and the body without resorting to packing, grease seals, or other expedients such as are commonly employed in structures of this general character Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A valve including a body having a flow passage and an opening intersecting the passage, a plug in the opening and having a port, the plug being rotatable in the opening to move the port into and out of register with the opening and having a stem at one end, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism coupling the plug and plate against relative rotation except when the plate is in register with the passage, said mechanism including, a rigid member movable relative to the plug and body, means coupling the plate and said member for radial movement of the plate relative to said member and against relative movement between said member and the plate about the axis of the plug, and a lock adapted to positively connect said member and the plug to turn together about the axis of the plug only during movement of the plug between an open position where the port is in register with the passage and a closed position where the plate is in register with the passage.

2. A valve including a body having a flow passage and an opening intersecting the passage, a plug in the opening and having a port, the plug being rotatable in the opening to move the port into and out of register with the opening and having a stem at one end, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism releasably coupling the plug and plate against relative rotation except when the plate is in register with the passage, said mechanism including, a rigid annular member at one end of the plug concentric with the plug and movable relative to the plug and body about the axis of the plug, means coupling the plate and said member for radial movement of the plate relative to said member and against relative movement between said member and the plate about the axis of the plug, and a lock adapted to positively connect said member and the plug to turn together about the axis of the plug only during movement of the plug between an open position where the port is in register with the passage and a closed position where the plate is in register with the passage.

3. A valve including a body having a flow passage and an opening intersecting the passage, a plug in the opening and having a port, the plug being rotatable in the opening to move the port into and out of register with the opening and having a stem at one end, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism positively coupling the plug and plate against relative rotation except when the plate is in register with the passage, said mechanism including, a rigid member movable relative to the plug and body and having a socket therein, a rigid projection on the plate engaged in the socket and coupling the plate and said member for radial movement of the plate relative to said member and against relative movement between said member and the plate about the axis of the plug, a positive lock adapted to connect said member and the plug to turn together about the axis of the plug only during movement of the plug between an open position where the port is in register with the passage and a closed position where the plate is in register with the passage, and a stop in the body adapted to positively stop the plate in register with the passage upon its being moved to that position from a position where the valve is open.

4. A valve including a body having a flow passage and an opening intersecting the passage, a plug in the opening and having a port, the plug being rotatable in the opening to move the port into and out of register with the opening and having a stem at one end and having a part with a recess therein, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism coupling the plug and plate against relative rotation except when the plate is in register with the passage, said mechanism including a rigid member movable relative to the plug and body and coupled with the plate for radial movement of the plate relative to said member and against relative movement between the plate and said member about the axis of the plug, and a rigid lock part carried by said member and adapted to engage in said recess to connect said member and the plug to turn together about the axis of the plug only during movement of the plug between an open position where the port is in register with the passage and a closed position where the plate is in register with the passage.

5. A valve including a body having a flow passage and an opening intersecting the passage, a plug in the opening and having a port, the plug being rotatable in the opening to move the port into and out of register with the opening and having a stem at one end and having a part with a recess therein, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism coupling the plug and plate against relative rotation except when the plate is in register with the passage, said mechanism including a member movable relative to the plug and body and coupled with the plate for radial movement of the plate relative to said member and against relative movement between the plate and said member about the axis of the plug, and a rigid lock part carried by said member and adapted to engage in said recess to connect said member and the plug to turn together about the axis of the plug only during movement of the plug between an open position where the port is in register with the passage and a closed position where the plate is in register with the passage, the body having a recess therein adapted to receive the lock part when the plate is in the registering position.

6. A valve including a body having a flow passage and an opening intersecting the passage, a plug in the opening and having a port, the plug being rotatable in the opening to move the port into and out of register with the opening and having a stem at one end and having a part with a recess therein, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism positively coupling the plug and plate against relative rotation except when the plate is in register with the passage, said mechanism including a rigid member movable relative to the plug and body and coupled with the plate for radial movement of the plate relative to said member and against relative movement between the plate and said member about the axis of the plug, a rigid lock part carried by said member and adapted to engage in said recess to connect said member and the plug to turn together about the axis of the plug only during movement of the plug between an open position where the port is in register with the passage and a closed position where the plate is in register with the passage, and a stop adapted to stop movement of said member relative to the body upon the plate being moved from the open position to the closed position.

7. A valve including a body having a flow passage and an opening intersecting the passage, a plug in the opening and having a port, the plug being rotatable in the opening to move the port into and out of register with the opening and having a stem at one end and having a part with a recess therein, a sealing plate carried by the plug, the plug being adapted to turn relative to the plate and the plate being adapted to register with the passage and to shift radially relative to the plug to engage the wall of the opening completely around the passage, means operable by rotation of the plug relatively to the plate whereby the plate is shifted radially relative to the plug, and a control mechanism positively coupling the plug and plate against relative rotation except when the plate is in register with the passage, said mechanism including a rigid member movable relative to the plug and body and coupled with the plate for radial movement of the plate relative to said member and against relative movement between the plate and said member about the axis of the plug, a rigid lock part carried by said member and adapted to engage in said recess to connect said member and the slug to turn together about the axis of the plug only during movement of the plug between an open position where the port is in register with the passage and a closed position where the plate is in register with the passage, and a stop rigid with the body and engageable with said member to stop movement of said member relative to the body upon the plate being moved from the open position to the closed position.

8. A valve including a body having a flow passage and an opening intersecting the passage, a plug in the opening and having a port, the plug being rotatable in the opening to move the port into and out of register with the opening and having a stem at one end, the plug and body having spaced parts with recesses therein, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism positively coupling the plug and plate against relative rotation except when the plate is in register with the passage, said mechanism including a floating ring concentric with the plug and having spaced projections between said parts of the plug and body, said ring having a socket therein, a lug on the plate engaged in the socket connecting the plate to said ring against movement relative thereto about the plug and for movement relative thereto radially of the plug, and a lock element carried between said projections against movement relative to the ring about the axis of the plug and adapted to project into the recess in said part of the plug and lock the ring against movement relative to the plug when the plug is between an open position where the port registers with the passage and a closed position where the plate registers with the passage, and adapted to project into the recess in said part of the body and lock the ring against movement relative to the body when the plate is in the registering position.

9. A valve including a body having a flow passage and an opening intersecting the passage, a plug in the opening and having a port, the plug being rotatable in the opening to move the port into and out of register with the opening and having a stem at one end, the plug and body having spaced parts with recesses therein, a sealing plate carried by the plug, the plug being adapted to turn relative to the plate and the plate being adapted to register with the passage and to shift radially relative to the plug to engage the wall of the opening completely around the passage, means operable by rotation of the plug relative to the plate whereby the plate is shifted radially relative to the plug, and a control mechanism coupling the plug and plate against relative rotation except when the plate is in register with the passage, said mechanism including a floating ring concentric with the plug and having spaced projections between said parts of the plug and body, said member having a socket therein, a lug on the plate engaged in the socket connecting the plate to said ring against movement relative thereto about the plug and for movement relative thereto radially of the plug, a lock element carried between said projections against movement relative to the ring about the axis of the plug and adapted to project into the recess in said part of the plug and lock the ring against movement relative to the plug when the plug is between an open position where the port registers with the passage and a closed position where the plate registers with the passage, and adapted to project into the recess in said part of the body and lock the ring against movement relative to the body when the plate is in the registering position, and a stop on the body cooperating with one of said projections on the ring to positively stop movement of the ring relative to the body beyond a position where the plate registers with the passage.

References Cited in the file of this patent
UNITED STATES PATENTS

| | | |
|---|---|---|
| 1,888,000 | Heggem | Nov. 15, 1932 |
| 2,290,332 | Johnson | July 21, 1942 |
| 2,609,174 | Heinen | Sept. 2, 1952 |
| 2,612,340 | Laurent | Sept. 30, 1952 |